United States Patent Office 3,846,121
Patented Nov. 5, 1974

3,846,121
METHOD FOR PREPARING SCANDIUM METAL
Frederick A. Schmidt and Oscar N. Carlson, Ames, Iowa, assignors to the United States of America as represented by the United States Atomic Energy Commission
No Drawing. Continuation-in-part of abandoned application Ser. No. 323,184, Jan. 12, 1973. This application Apr. 10, 1974, Ser. No. 459,825
Int. Cl. C22b 61/00
U.S. Cl. 75—62                                  7 Claims

ABSTRACT OF THE DISCLOSURE

High-purity scandium metal is prepared from scandium oxide by firing the scandium oxide in air to remove any volatile residual material and free carbon which may be present, chlorinating the fired oxide with phosgene to scandium chloride, and reducing the scandium chloride with magnesium, calcium or mixtures thereof to scandium metal. The metal may then be further purified by vacuum distillation or arc-melting.

---

This is a continuation-in-part of application Ser. No. 323,184, filed Jan. 12, 1973 now abandoned.

CONTRACTUAL ORIGIN OF THE INVENTION

The invention described herein was made in the course of, or under, a contract with the United States Atomic Energy Commission.

BACKGROUND OF THE INVENTION

This invention relates to a process for preparing scandium metal. More specifically, this invention relates to a process for preparing a high-purity scandium metal from scandium oxide.

Scandium metal is generally prepared by the reduction of scandium halides such as the fluoride or chloride. Scandium fluoride is prepared by fluorinating scandium oxide with ammonium hydrogen fluoride or hydrogen fluoride gas. The scandium fluoride can then be reduced by mixing it with calcium and heating the mixture to about 1600° C. in a tantalum or tungsten crucible or mixing it with calcium, zinc and lithium fluoride and heating the mixture in a tantalum bomb. This latter process has the disadvantages that very large crucible volumes are required and that the additives will contribute impurities to the final product. In either process, the resulting scandium metal will contain fluorine which is a difficult impurity to remove.

Scandium chloride may be formed by contacting the oxide with gaseous chlorine, gaseous HCl, gaseous CCl$_4$, C$_2$Cl$_6$ or other known chlorinating agents. However, in general, these processes required that the oxide be first mixed with a carbonaceous material before subjecting the oxide to the chlorinating agent. This presence of carbon has the advantage of improving the chlorination yields, but it also results in the presence of free carbon in the scandium chloride which can, in turn, result in free carbon in the final scanidum metal product, reducing its purity. The use of ammonium chloride has also been described for the chlorination of scandium oxide. However, its use results in less than optimum chlorination yields and in addition adds nitrogen as an impurity to the final product which is difficult to remove.

SUMMARY OF THE INVENTION

It has been found that, by firing the scandium oxide in air and chlorinating the fired oxide with phosgene gas, it is possible to obtain a very high yield of scandium chloride with very little scandium oxide or carbon present as an impurity. By the process of the invention for preparing high-purity scandium metal, the scandium oxide is fired in air to from 850 to 950° C. for 4 to 6 hours to drive off residual material and carbon which may be contained therein, the fired oxide is then heated to from 650 to 750° C. and phosgene gas is passed over the heated oxide to chlorinate the oxide to scandium chloride, the scandium chloride is then mixed with magnesium, calcium or mixtures of magnesium and calcium to form a charge which is then heated to from 800 to 1000° C. under reduced pressure to reduce the scandium oxide to scandium metal.

It is therefore one object of the invention to provide an improved chlorination process for scandium oxide.

It is a further object to provide an improved chlorination process for scandium oxide using phosgene as a chlorinating agent.

Finally, it is the object of the invention to provide a process for preparing high-purity scandium metal from scandium oxide.

DETAILED DESCRIPTION OF THE INVENTION

These and other objects of the invention may be met by firing the scandium oxide to be chlorinated in air to a temperature of about 900° C. for a period of about 5 hours to drive off any volatile materials and carbon which may be present therein, heating the fired oxide to about 700° C., passing phosgene gas over the heated oxide to chlorinate the scandium oxide to scandium chloride, mixing the scandium chloride with a member selected from the group consisting of magnesium and calcium and mixtures thereof to form a charge, heating the charge under reduced pressure to from about 800 to 1000° C. whereby the scandium chloride is reduced to scandium metal, and recovering the scandium metal.

It is important that the oxide be fired in air in order to obtain good chlorination results and to improve the purity of the scandium metal product. By firing the oxide, any volatile materials in the oxide are driven off, as is any free carbon which may be present. Additionally, the firing insures that any metal present is oxidized to the oxide. Firing temperatures may range from about 850 to 950° C. with 900° C. preferred. Temperatures below 850° C. will not completely drive out the volatiles, while temperatures over 950° C. will produce sintering which will have a deleterious effect upon the chlorination. The time of firing is not critical but must be sufficient to achieve the desired results. In general, 4 to 6 hours was found to be quite adequate, with 5 hours preferred.

Although the fired scandium oxide can be chlorinated by any means known to those skilled in the art, such as gaseous CCl$_4$, phosgene is much preferred since it dissociates to form a reducing atmosphere containing no free carbon, and the best results were achieved therewith. It was found that the chlorination temperature should be at least 650° C. to obtain good chlorination results and not over 750° C. where a loss of product might result due to sublimation. In general, a temperature of 700° C. is preferred. The time for chlorination is not critical but must be sufficient to completely chlorinate the oxide present.

In the table below are shown the results of a number of experiments in which the scandium oxide was fired in air and the results of chlorinating the fired scandium oxide.

| Run No. | Temperature at which $Sc_2O_3$ was heated in air (° C.) | Time, hrs. | Temperature at which chlorination was made using $COCl_2$ (° C.) | Time, hrs. | Percent chlorine in $ScCl_3$ (70.29%), theo. | Percent conversion |
|---|---|---|---|---|---|---|
| FRS-24-30 | 600 | 12 | 600 | 2 | 58.49 | 83.21 |
| FRS-24-31A | 600 | 12 | 600 | 4 | 66.29 | 94.31 |
| FRS-24-31B | 600 | 12 | 700 | 6 | 67.17 | 95.56 |
| FRS-24-32 | 600 | 12 | 800 | 6 | ¹ 50.67 | 72.09 |
| FRS-24-34 | 900 | ² 5 | 700 | 6 | 68.63 | 97.64 |
| FRS-24-42 | 900 | ² 5 | 700 | 6 | 68.50 | 97.45 |
| FRS-24-43 | 900 | 5 | 700 | 12 | 68.61 | 97.61 |
| FRS-24-48 | 900 | 5 | 800 | 5½ | 68.53 | 97.49 |
| FRS-24-63 | 900 | 5 | 700 | 6½ | 69.93 | 99.49 |
| FRS-24-67 | 900 | 5 | 700 | 6½ | 69.76 | 99.25 |
| FRS-24-68 | 900 | 5 | 700 | 6½ | 69.91 | 99.46 |
| FRS-24-71 | 900 | 5 | 700 | 6½ | 69.17 | 98.41 |

¹ Believed to have formed some ScOCl at high chlorination temperature.
² Repeat run.

It can be seen from the results in the table above that the temperatures at which the scandium oxide is fired in air and at which chlorination takes place have a rather definite effect upon the percent of chlorination of the fired scandium oxide.

The amount of magnesium or calcium need only be the amount calculated to result in complete reduction of the scandium chloride present in the charge in addition to a slight excess. When magnesium or calcium are used to reduce the scandium chloride, an excess of magnesium is added to the charge so that the scandium metal will upon reduction form a low-melting massive scandium-magnesium alloy containing 40 to 60 wt. percent magnesium, although a 60 wt. percent alloy is preferred. By obtaining a massive metal alloy rather than a metal sponge as with some other processes, it is possible to reduce the contamination which might result by exposure to the atmosphere.

If calcium alone is used to reduce the scandium chloride, only a slight excess (1-2%) of the calculated amount of calcium necessary to complete the reduction step need be added to the charge. The use of calcium alone to reduce the scandium chloride has the obvious advantage of eliminating the necessity for separating the magnesium alloying metal from the reduced scandium metal. This process has a further advantage in that the scandium metal is recovered as platelets which can easily be compressed into a billet to be further purified by electron beam melting.

Reduction is carried out by heating the charge in a vacuum to about 800° C. to initiate the reduction reaction and gradually increasing the temperature to about 1000° C. and maintaining this temperature for a period of time until the reduction reaction is complete. Generally 2-3 hours is sufficient for complete reduction when magnesium is present in the charge and 8-16 hours is necessary when calcium is used alone.

It is preferred that the reduction step be carried out in a tantalum crucible to prevent contamination of the scandium.

The scandium can be readily recovered from the scandium-magnesium alloy by heating the alloy to a temperature of about 1050° C. under a vacuum for a period of time to distill off the magnesium metal, leaving the scandium metal as a sponge.

If purification is required, the scandium platelets or sponge are compacted and consolidated into a billet by conventional nonconsumable arc melting under a partial pressure of about ⅔ atmosphere of purified argon gas. Further purification could be achieved by electron beam melting the scandium metal.

The following examples are given as illustrative of the method of the invention and are not to be taken as limiting the invention as defined by the claims.

Example I

A quantity of scandium oxide was heated in air to 900° C. for 5 hours to drive off the residual volatile compounds present and any carbon which may have been present in the material. The fired scandium oxide was then heated to 700° C. and maintained for a period of 6 hours under an atmosphere of phosgene gas which was flowing at a rate of 50 cc. per minute. Upon completion of the chlorination period, the $ScCl_3$ which was formed was analyzed and found to contain 68.63% chlorine. The theoretical chlorine content of $ScCl_3$ is 70.29, indicating a $ScCl_3$ yield of 97.6 to 98%.

Example II 18 grams of $ScCl_3$ prepared as above and 12.35 grams of double-distilled magnesium were mixed together and heated to 800° C. for ¾ hour, to 900° C. for ½ hour and to 1000° C. for ¾ hour until the reduction reaction was complete and a massive scandium—60% magnesium alloy was formed. Upon analysis, it was determined that the yield of scandium metal from the scandium chloride was 75%. The alloy was heated to 1050° C. under a vacuum of $10^{-6}$ Torr for 19 hours to distill off the magnesium metal until only a scandium sponge remained. The sponge was compacted and arc-melted. The scandium metal was analyzed and found to contain the following impurities: C—240 p.p.m., $O_2$—590 p.p.m., N—18 p.p.m., H—128 p.p.m., Ni—<20 p.p.m., Ca—200 p.p.m., Cr—<50 p.p.m., Si—<30 p.p.m., Fe—300 p.p.m., and Mg—30 p.p.m.

Example III 9.56 grams of $ScCO_2$ was heated to 900° C. and maintained at this temperature for 5 hours to drive off any residual volatile compounds present in the oxide. The oxide was then heated to 700° C. while phosgene gas was passed over the oxide at a flow rate of 50 cc. per minute for 6½ hours to chlorinate the oxide to $ScCl_3$. The chloride so formed was analyzed and found to contain 69.93% chlorine. This indicates a yield of $ScCl_3$ of 99.24%.

Example IV

A charge was prepared containing 65.8 grams $ScCl_3$ and 27.0 grams calcium which had been triple-sublimed. The $ScCl_3$ was prepared as described in Example I. The charge was placed into a tantalum crucible with the calcium in the bottom and the $ScCl_3$ on top. A vacuum of about $10^{-5}$ Torr was established and the crucible was sealed by electron beam welding. The crucible was heated to 875° C. for 24 hours, and allowed to cool. Upon opening up the sealed crucible, it was observed that all of the scandium chloride appeared to have been reduced and many small platelets of scandium metal were noted around the calcium chloride which had formed.

The scandium metal is separated from the calcium chloride by melting the calcium chloride and allowing it to run off, leaving the pure scandium metal in the crucible. The scandium metal was analyzed and found to contain the following impurities: C—320 p.p.m., $O_2$—880 p.p.m., $N_2$—25 p.p.m., Ni<20 p.p.m., Ca—10 p.p.m., Cr—<50 p.p.m., Si—50 p.p.m., Fe—100 p.p.m., and Mg—<20 p.p.m.

As can be seen from the above examples, excellent chlorination results are obtainable as a result of the process of this invention and that the scandium chloride product results in the production of a high-purity scandium metal.

The embodiments of the invention in which an exclusive property or privilege is claimed are defined as follows:

1. A process for preparing high-purity scandium metal from scandium oxide comprising:
    (a) firing the scandium oxide at 850 to 950° C. in air for about 4 to 6 hours, thereby driving off any residual volatile materials and any carbon present in said oxide;
    (b) heating the fired oxide to 650 to 750° C.;
    (c) passing phosgene gas over the heated oxide, thereby chlorinating the oxide in a reducing atmosphere containing no free carbon to scandium chloride;
    (d) mixing the scandium chloride with a member selected from the group consisting of magnesium, calcium and mixtures thereof to form a charge;
    (e) heating the charge under reduced pressure to from about 800 to 1000° C., whereby the scandium chloride is reduced to scandium metal; and
    (f) recovering the high-purity scandium metal.

2. The process of claim 1 wherein the oxide is fired in air at about 900° C. and the fired oxide is chlorinated at 700° C.

3. The process of claim 2 wherein the scandium chloride is mixed with magnesium to form a charge, said charge containing sufficient magnesium to completely reduce the scandium chloride present to scandium metal plus an excess of magnesium to form a massive scandium-magnesium alloy containing 40 to 60 wt. percent magnesium.

4. The process of claim 3 wherein the scandium-magnesium alloy is heated in a vacuum to 1050° C. for a period of time sufficient to distill off the magnesium present, thereby leaving the high-purity scandium metal.

5. The method of claim 2 wherein the scandium chloride is mixed with calcium and magnesium to form a charge, said charge containing sufficient calcium to completely reduce the scandium chloride to scandium metal, said charge also containing sufficient magnesium to produce a massive scandium-magnesium alloy containing 40 to 60 wt. percent magnesium.

6. The process of claim 5 wherein the scandium-magnesium alloy is heated in a vacuum to 1050° C. for a period of time sufficient to distill off the magnesium present, thereby leaving the high-purity scandium metal.

7. The process of claim 2 wherein the scandium chloride is mixed with calcium to form a charge, the charge containing sufficient calcium to completely reduce the scandium chloride present to scandium metal platelets.

References Cited
UNITED STATES PATENTS

| | | | |
|---|---|---|---|
| 2,874,039 | 2/1959 | Pruvot | 75—84.5 |
| 3,130,168 | 4/1964 | Hov et al. | 423—491 |
| 3,186,834 | 6/1965 | Schechter et al. | 75—84.5 |
| 3,153,570 | 10/1964 | Domning et al. | 423—491 |

L. DEWAYNE RUTLEDGE, Primary Examiner

M. J. ANDREWS, Assistant Examiner

U.S. Cl. X.R.

75—63, 67 A